United States Patent
Ortega Pena et al.

(10) Patent No.: US 12,537,993 B2
(45) Date of Patent: Jan. 27, 2026

(54) SMART HOME AUTOMATION USING MULTI-MODAL CONTEXTUAL INFORMATION

(71) Applicant: Samsung Electronics Co., Ltd., Suwon-si (KR)

(72) Inventors: Andres Leonardo de Jesus Ortega Pena, San Jose, CA (US); Ashwin Chandra, Santa Clara, CA (US); Suk-Un Yoon, Suwon-si (KR); David Ho Suk Chung, Rancho Palos Verdes, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 18/073,358

(22) Filed: Dec. 1, 2022

(65) Prior Publication Data

US 2024/0187687 A1    Jun. 6, 2024

(51) Int. Cl.
*H04N 21/442*    (2011.01)
*H04N 21/45*    (2011.01)

(52) U.S. Cl.
CPC ... *H04N 21/44218* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 10,181,960 B2 | 1/2019 | Kim et al. | |
| 10,522,143 B2 | 12/2019 | Chandrasekaran et al. | |
| 11,237,530 B2 | 2/2022 | Fadell et al. | |
| 11,347,805 B2 | 5/2022 | Ahn | |
| 11,423,090 B2 | 8/2022 | Chism et al. | |
| 2010/0315549 A1* | 12/2010 | Basso | H04N 21/4402 348/E7.003 |
| 2020/0210721 A1* | 7/2020 | Goel | G06F 18/24 |
| 2021/0191779 A1 | 6/2021 | Zamarato et al. | |
| 2021/0344991 A1* | 11/2021 | Todd | H04N 21/4438 |
| 2022/0083409 A1 | 3/2022 | Lee et al. | |

(Continued)

OTHER PUBLICATIONS

Google, "Introducing Google Nest Hub Max," https://support.google.com/googlenest/answer/9334359?hl=en, Oct. 2022, 2 pages.

(Continued)

*Primary Examiner* — Jason K Lin

(57) ABSTRACT

A method includes obtaining one or more inputs at a first electronic device. The first electronic device includes a multi-task dynamic machine learning model that includes multiple sub-models configured to perform different machine learning functions. The method also includes dynamically controlling the sub-models used to process the one or more inputs based on at least one of: (i) the one or more inputs that are available for use or (ii) one or more outputs to be generated. The method further includes generating a set of contextual information associated with the first electronic device. At least a portion of the set of contextual information is associated with at least one user of the first electronic device. The method may additionally include sharing the set of contextual information with at least a second electronic device in a specified environment.

20 Claims, 6 Drawing Sheets

(56) References Cited

U.S. PATENT DOCUMENTS

2022/0318684 A1* 10/2022 Allahdadian ............ G06N 3/04
2023/0140369 A1*  5/2023 Aminian ............... G06F 16/739
                                                          382/103
2023/0259740 A1*  8/2023 Kulkarni ................ G06N 3/045
                                                          706/20

OTHER PUBLICATIONS

Google, "Face Match on Google Nest Hub Max," https://support.google.com/googlenest/answer/9320885?hl=en, Jun. 2022, 3 pages.

* cited by examiner

SMART HOME AUTOMATION USING MULTI-MODAL CONTEXTUAL INFORMATION

TECHNICAL FIELD

This disclosure relates generally to automation systems. More specifically, this disclosure relates to smart home automation using multi-modal contextual information.

BACKGROUND

Smart televisions are being used in more and more households across the world. Smart televisions are often centrally-located within households and have large display screens. As a result, smart televisions are becoming the preferred hub for visual information, configuration, and automation of smart home devices. For example, smart televisions can be used to support user task initiation and monitoring for smart home automation functions.

SUMMARY

This disclosure relates to smart home automation using multi-modal contextual information.

In a first embodiment, a method includes obtaining one or more inputs at a first electronic device. The first electronic device includes a multi-task dynamic machine learning model that includes multiple sub-models configured to perform different machine leaning functions. The method also includes dynamically controlling the sub-models used to process the one or more inputs based on at least one of: (i) the one or more inputs that are available for use or (ii) one or more outputs to be generated. The method further includes generating a first set of contextual information associated with the first electronic device. At least a portion of the first set of contextual information is associated with at least one user of the first electronic device.

In a second embodiment, an electronic device includes at least one memory configured to store a multi-task dynamic machine learning model that includes multiple sub-models configured to perform different machine learning functions. The apparatus also includes at least one processing device configured to obtain one or more inputs, dynamically control the sub-models used to process the one or more inputs based on at least one of: (i) the one or more inputs that are available for use or (ii) one or more outputs to be generated, and generate a first set of contextual information associated with the electronic device. At least a portion of the first set of contextual information is associated with at least one user of the electronic device.

In a third embodiment, a non-transitory computer readable medium contains instructions that when executed cause at least one processor of an electronic device to obtain one or more inputs and provide the one or more inputs to a multi-task dynamic machine learning model that includes multiple sub-models configured to perform different machine learning functions. The non-transitory computer readable medium also contains instructions that when executed cause the at least one processor to dynamically control the sub-models used to process the one or more inputs based on at least one of: (i) the one or more inputs that are available for use or (ii) one or more outputs to be generated. The non-transitory computer readable medium further contains instructions that when executed cause the at least one processor to generate a first set of contextual information associated with the electronic device. At least a portion of the first set of contextual information is associated with at least one user of the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (MMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MIRA) device, a magnetic resource imaging (MIRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
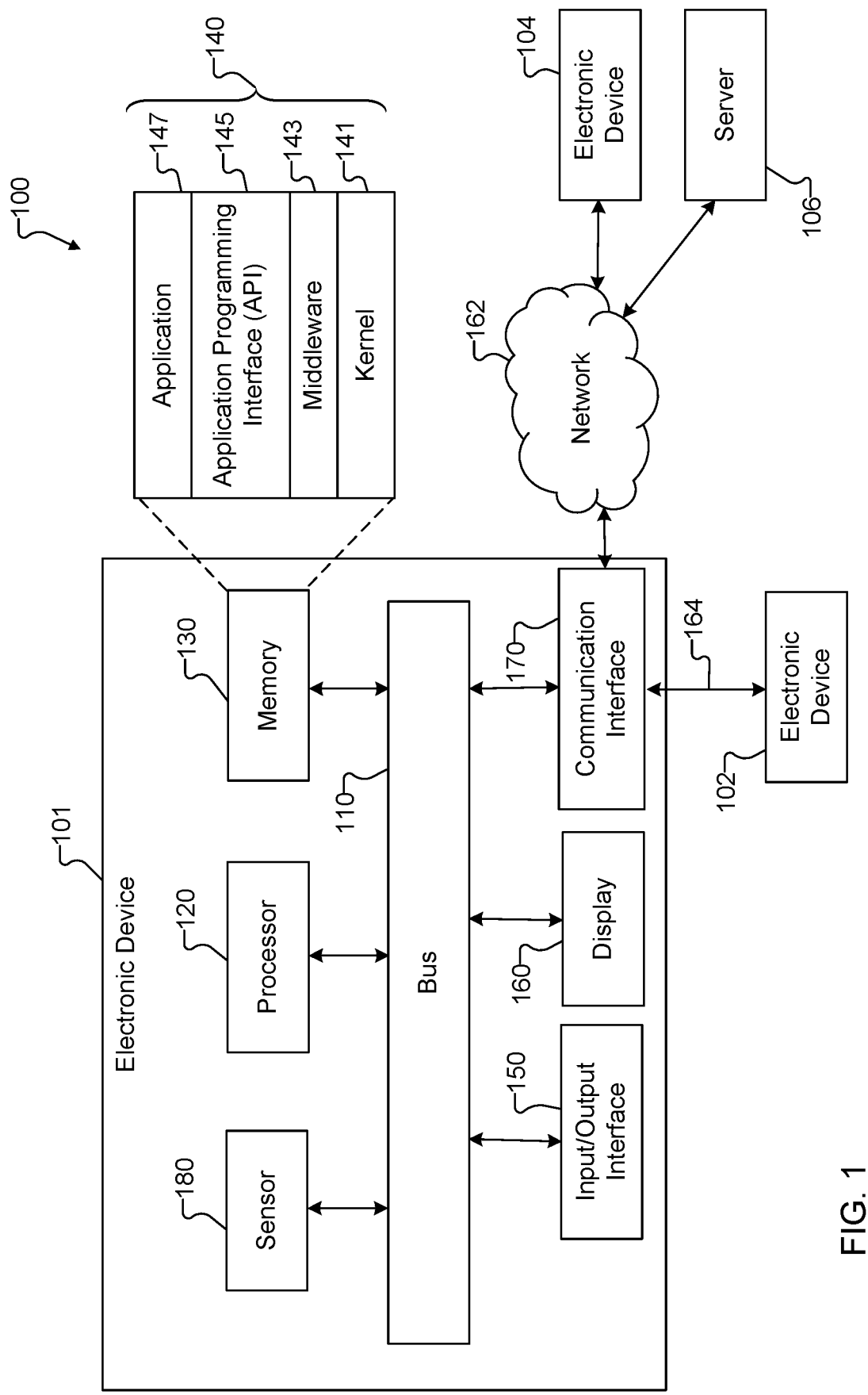
FIG. 1 illustrates an example network configuration including an electronic device in accordance with this disclosure.

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, smart televisions are being used in more and more households across the world. Smart televisions are often centrally-located within households and have large display screens. As a result, smart televisions are becoming the preferred hub for visual information, configuration, and automation of smart home devices. For example, smart televisions can be used to support user task initiation and monitoring for smart home automation functions. When a user interacts with a smart home virtual assistant, various sensor observations can be compiled or queried in order to produce an overall estimate of the state of the user's household. This overall estimate can typically be used to assess what the best rule-based automation or inquiry response should be to satisfy the user's intent. Unfortunately, these observations do not always provide an accurate representation of the activities related to the user's intent.

In current smart home automation and interaction approaches, success in understanding a user's intent typically depends on the user's utterance and the state of the user's household. Many times, a user's interaction (whether via voice or button presses) fails to produce a desired result because of a lack of comprehensive contextual information. Contextual information can include information such as the location where a user interaction is occurring, what human activity or activities are occurring at the time of the user interaction, who is present or performing the activity or activities, and the state(s) of one or more other smart home devices in the household. As a result, the use of a smart television is often limited to media content consumption. If a smart television or other smart device can know more about its environment, a whole new set of user experiences can be enabled, but that is not the case today. In addition, smart televisions today do not communicate with each other and exchange contextual information. This can severely impact user experiences, such as when a user roams throughout his or her household in different locations and contexts.

This disclosure provides various techniques for smart home automation using multi-modal contextual information. As described in more detail below, one or more inputs are obtained at a first electronic device, such as a first smart television or other smart home automation device. The one or more inputs may include multi-modal inputs, such as visual and audio inputs obtained from various sensors of the first electronic device or other sensors. The first electronic device includes a multi-task dynamic machine learning model that includes multiple sub-models configured to perform different machine learning functions. The sub-models may perform various machine learning functions based on the one or more inputs, such as room type classification, user pose estimation, user activity recognition, face identification, user gender estimation, user age estimation, and voice identification.

The sub-models that are actually used to process the one or more inputs can be dynamically controlled, such as based on the one or more inputs that are available for use and/or one or more outputs to be generated. User preferences can also be taken into account here, such as to support user preferences related to privacy. A first set of contextual information associated with the first electronic device can be generated, where at least a portion of the first set of contextual information is associated with at least one user of the first electronic device. The first set of contextual information can be shared with at least a second electronic device, such as another smart television or other smart home automation device, in a specified environment. Also, a second set of contextual information may be received from the second electronic device or a third electronic device, such as yet another smart television or other smart home automation device, in the specified environment. This allows at least one of the electronic devices (and ideally multiple electronic devices) to acquire contextual information over time, such as when at least one user moves within the specified environment.

In this way, it is possible for smart televisions or other smart home automation devices to gather contextual information in an environment around the smart home automation devices using available (and possibly multi-modal) sensors and to apply that contextual information intelligently to smart home experiences. Smart televisions often have ideal locations in rooms within households since televisions are often placed in locations where they are visible throughout much or all of the associated rooms. Thus, sensors on or associated with the smart televisions may have a very good chance of capturing relevant contextual information. Moreover, many households contain multiple televisions, so enabling multiple smart televisions to exchange contextual information around the household can help to further improve user experiences. In addition, the ability to selectively control which sub-models of the multi-task dynamic machine learning model are used to process inputs can help to facilitate use of the described functionalities with smart televisions or other end-user devices that are more constrained in terms of processing power or memory resources. Overall, these techniques help smart televisions or other smart home automation devices to more effectively understand their environments, generate contextual information based on a number of characteristics (such as room surroundings, detected human activities, and user information), and share that contextual information with each other.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 represents a smart home automation device, such as a smart television. The electronic device 101 can include at least one of a bus 110, a processor 120, a memory 130, an input/output (110) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, mnicrocontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to collect, share, and use multi-modal contextual information to support one or more smart home automation functions.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for collecting, sharing, and using multi-modal contextual information to support one or more smart home automation functions. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th Generation (5G) wireless system, millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red-green-blue or RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (JR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first and second external electronic devices 102 and 104 and server 106 each can be a device of the same or a different type from the electronic device 101. For example, in some cases, either of the first external electronic device 102 and the second external electronic device 104 may represent another smart home automation device, such as another smart television, within the same specified environment as the electronic device 101 (like within the same household). According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to collect, share, and use multi-modal contextual information to support one or more smart home automation functions.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
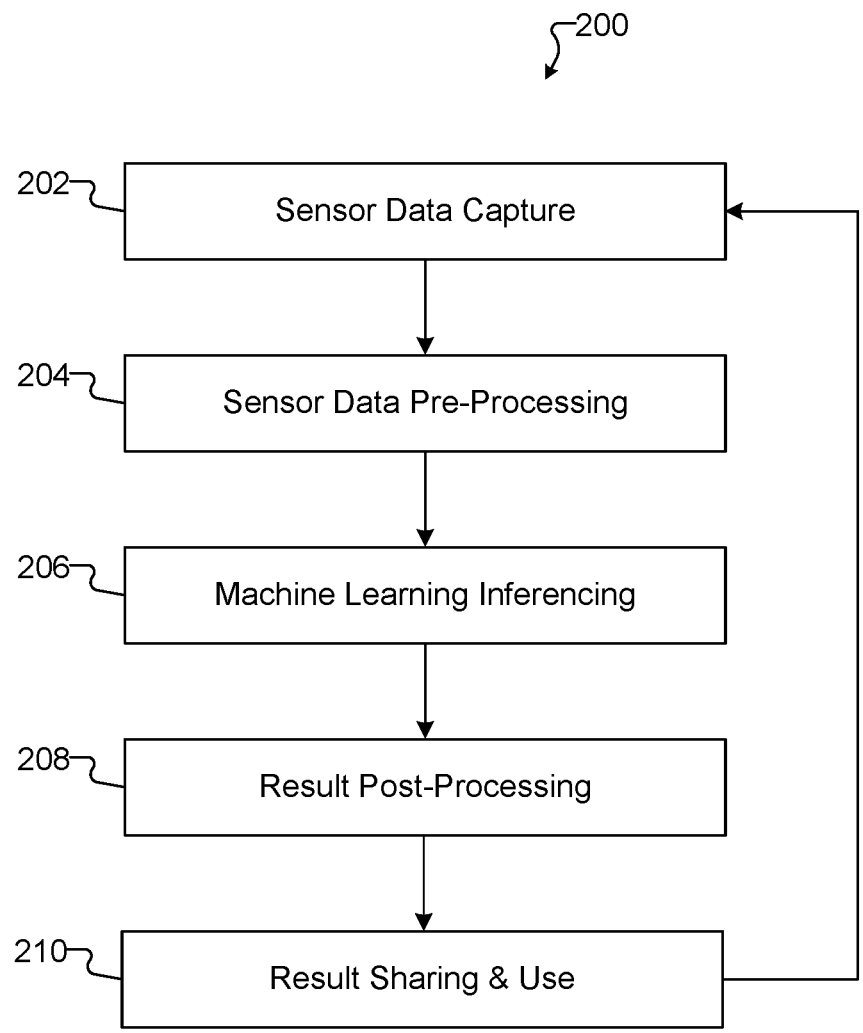
FIG. 2 illustrates an example process supporting smart home automation using multi-modal contextual information in accordance with this disclosure.

FIG. 2 illustrates an example process 200 supporting smart home automation using multi-modal contextual information in accordance with this disclosure. For ease of explanation, the process 200 shown in FIG. 2 is described as being implemented on or supported by the electronic device 101 in the network configuration 100 of FIG. 1. However, the process 200 shown in FIG. 2 could be implemented on or supported by any other suitable device(s) and in any other suitable system(s), such as when the process 200 is also or alternatively performed using the electronic device 102, electronic device 104, or server 106.

As shown in FIG. 2, the process 200 includes a sensor data capture operation 202, which generally involves the electronic device 101 capturing or otherwise obtaining sensor measurements, such as visual measurements obtained using one or more cameras or other imaging sensors 180 and audio measurements obtained using one or more microphones or other audio sensors 180. Sensor measurements may be said to represent "multi-modal" sensor measurements when they include different types of measurements, such as visual and audio measurements. The sensor data capture operation 202 may be performed in any suitable manner, such as continuously, intermittently, or in response to one or more triggers. In some cases, the type(s) of sensor measurements can be constrained by hardware availability in the electronic device 101 and user preferences, such as user settings that allow or prohibit the collection of certain types of sensor measurements. The sensor data capture operation 202 can involve the use of any suitable type(s) of sensors or other structure(s) that can gather information associated with an environment around the electronic device 101.

The sensor measurements are provided to a sensor data pre-processing operation 204, which generally involves preparing the sensor measurements for further processing. The sensor data pre-processing operation 204 can involve any suitable pre-processing operations that help to condition or otherwise prepare the sensor measurements for analysis. As an example, RGB or other image frames from one or more cameras or other imaging sensors 180 may undergo normalization to help ensure that image contents of the image frames have similar brightness or other characteristics and scaling to help ensure that the image frames have a desired size. As another example, audio data can be converted into RGB or other image frames, and the audio data may be filtered before this conversion and scaled after this conversion so that the image frames have a desired size. Note, however, that any other or additional pre-processing may occur here. The sensor data pre-processing operation 204 can involve the use of any suitable type(s) of processing device(s) or other structure(s) that can pre-process data, such as an image processing pipeline for processing image data and a digital signal processor for processing audio data.

The pre-processed data can be packaged or otherwise formatted as needed or desired, such as into the form of input tensors. The pre-processed data is provided to a machine learning (ML) inferencing operation 206, which generally operates to analyze the pre-processed data in order to generate contextual information associated with the electronic device 101. At least some of the contextual information is associated with at least one user of the electronic device 101. For example, the contextual information associated with the electronic device 101 may include a room type associated with a location of the electronic device 101, such as an indication whether the electronic device 101 is located in a family room, bedroom, game room, or other type of location. The contextual information associated with the electronic device 101 may also include a human activity type associated with at least one activity by at least one user of the electronic device 101, such as an indication whether a user of the electronic device 101 is viewing content on a television, playing games, or engaging in other activities. In some cases, the identification of a human activity type can be based on an intermediate representation that includes a pose estimation of at least one user of the electronic device 101, where the pose estimation can identify a position of the user. The contextual information associated with the electronic device 101 may further include information about at least one user of the electronic device 101, such as at least one identity of the user(s), a number or quantity of users, at least one gender of the user(s), or at least one age of the user(s). These types of information may be obtained in any suitable manner, such as via facial or voice identification (for user identification), object recognition using captured images (for number of users identification), or image processing (for user gender or age estimation). Note that any other or additional information may be identified as part of the contextual information associated with the electronic device 101. Also note that any or all of the identified types of information above may be used as part of the contextual information associated with the electronic device 101.

As described below, the machine learning inferencing operation 206 may involve the use of a multi-task dynamic machine learning model, which represents a machine learning model that includes multiple sub-models configured to perform different machine learning functions. For example, different sub-models may be provided for performing room type classification, pose estimation, activity recognition, facial identification, voice identification, gender estimation, age estimation, and sentiment analysis. The electronic device 101 can dynamically control which of these sub-models is used to process sensor measurements or other data at any given time. In some cases, the determination of which sub-models to be used to process sensor measurements or other data can depend on the type(s) of input data available for processing and/or the type(s) of output result(s) to be produced during the machine learning inferencing operation 206, As a particular example, a machine learning model may use an internal graph to identify how features (which are determined based on the sensor measurements or other input data being processed) can flow to different sub-models depending on the input data and the output results, and the electronic device 101 can modify the internal graph to adapt to available inputs or required outputs by enabling or disabling certain sub-models. In some embodiments, at least some of the enabling or disabling of the sub-models can be based on user input, such as when a user can control whether visual inputs like images from one or more cameras or audio inputs like captured audio data from one or more microphones can be obtained and processed. This allows the user to select certain privacy settings that can be enforced by the electronic device 101.

In general, the machine learning inferencing operation 206 here can be used to produce a set of human-aware contextual information for use in one or more home automation-related functions. Moreover, the ability to selectively apply inputs to sub-models of the multi-task dynamic machine learning model used by the machine learning inferencing operation 206 can help to facilitate the generation of human-aware contextual information in one or more resource-constrained devices (which is common in smart televisions and other smart home automation devices). Since each sub-model may compete for resources like memory and processing time, this approach can be used to handle multiple input modalities while producing desired contextual outputs in one or more resource-constrained devices. The machine learning inferencing operation 206 can involve the use of any suitable type(s) of processing device(s) or other structure(s) that can process inputs using a machine learning model.

The contextual information generated during the machine learning inferencing operation 206 can be provided to a result post-processing operation 208, which generally operates to take the outputs of the machine learning model and convert them into specific values or results in their respective domains. For example, the machine learning inferencing operation 206 may generate multiple probabilities that the electronic device 101 is located in different types of rooms, and the result post-processing operation 208 can convert these probabilities into a final determination of the room type associated with the electronic device 101. Similar post-processing operations may occur for various other results produced by the machine learning inferencing operation 206. The result post-processing operation 208 can involve the use of any suitable type(s) of processing device(s) or other structure(s) that can process results generated using a machine learning model.

The post-processed results can be provided to a result sharing and use operation 210, which generally operates to exchange post-processed results with one or more other electronic devices or use the post-processed results. For example, the result sharing and use operation 210 can include transmitting the post-processed results representing the identified contextual information of the electronic device 101 to one or more other electronic devices, such as other smart devices like smart televisions. In some cases, the post-processed results can be provided to one or more registered subscribers via an application programming interface (API). The result sharing and use operation 210 may also include receiving contextual information from one or more other smart devices for combination with the contextual information generated by the electronic device 101. As a particular example, when multiple smart devices are communicatively coupled to a network, the smart devices may identify each other (such as via polling or broadcast messages) and register to receive contextual information from each other. This may allow at least one smart device to accumulate contextual information over time, such as by accumulating contextual information as a user moves from one location to another in his or her household. The result sharing and use operation 210 may further include using the post-processed results (and possibly contextual information from one or more other smart devices), such as to perform one or more home automation functions. For instance, the electronic device 101 may use the contextual information in order to identify one or more actions that are most likely to satisfy a user's intent when the user attempts to initiate a task. The result sharing and use operation 210 can involve the use of any suitable type(s) of processing device(s) or other structure(s) that can transmit, receive, or use contextual information.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of a process 200 supporting smart home automation using multi-modal contextual information, various changes may be made to FIG. 2. For example, various operations in FIG. 2 may be combined, further subdivided, replicated, rearranged, or omitted according to particular needs. Also, one or more additional operations may be included if needed or desired. In addition, while FIG. 2 illustrates one example process 200 where contextual information can be generated and shared, the techniques for contextual information generation and sharing may be used in any other suitable process.

Figure 3:
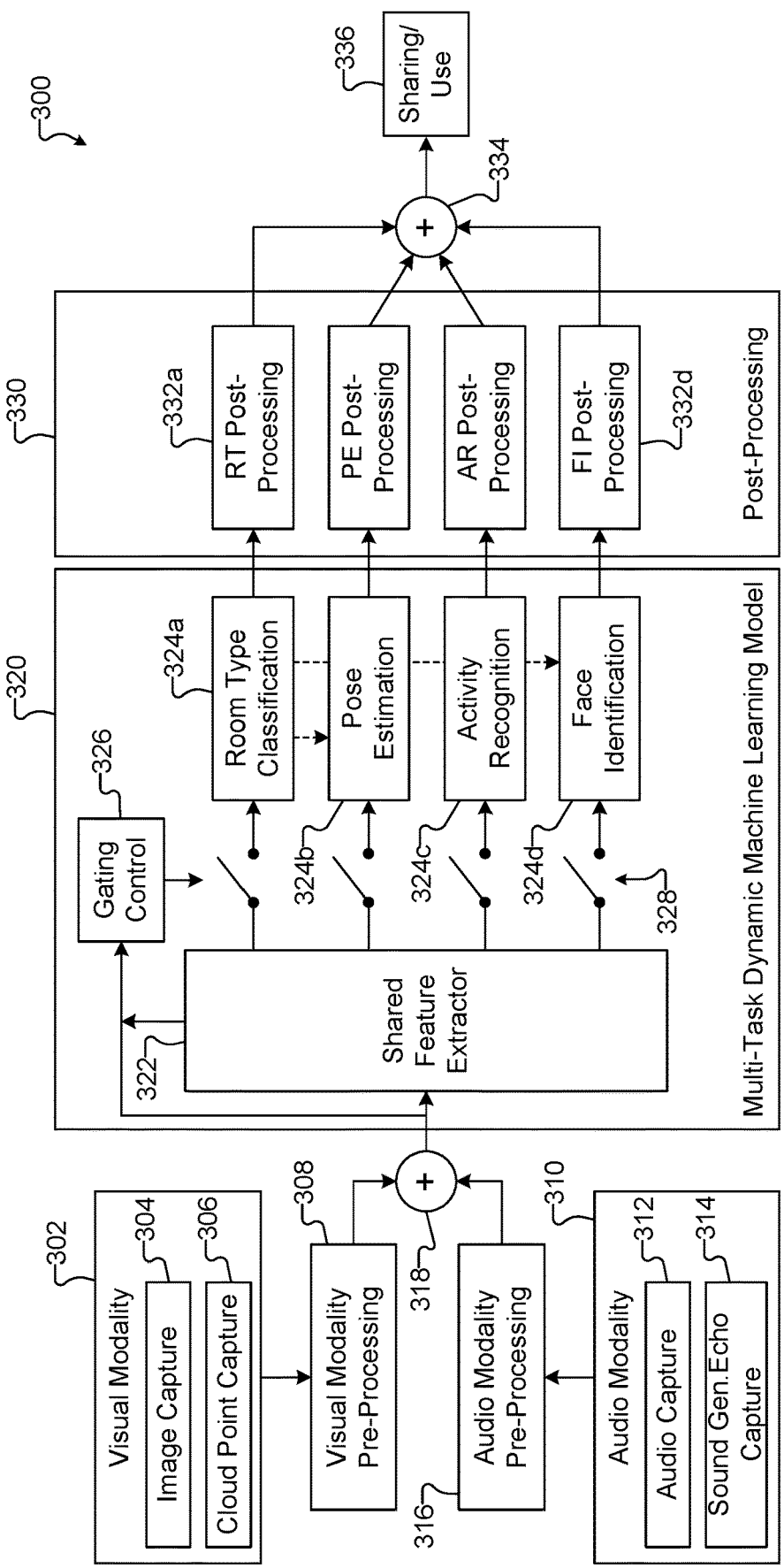
FIGS. 3 and 4 illustrate an example architecture supporting smart home automation using multi-modal contextual information in accordance with this disclosure.
Figure 4:
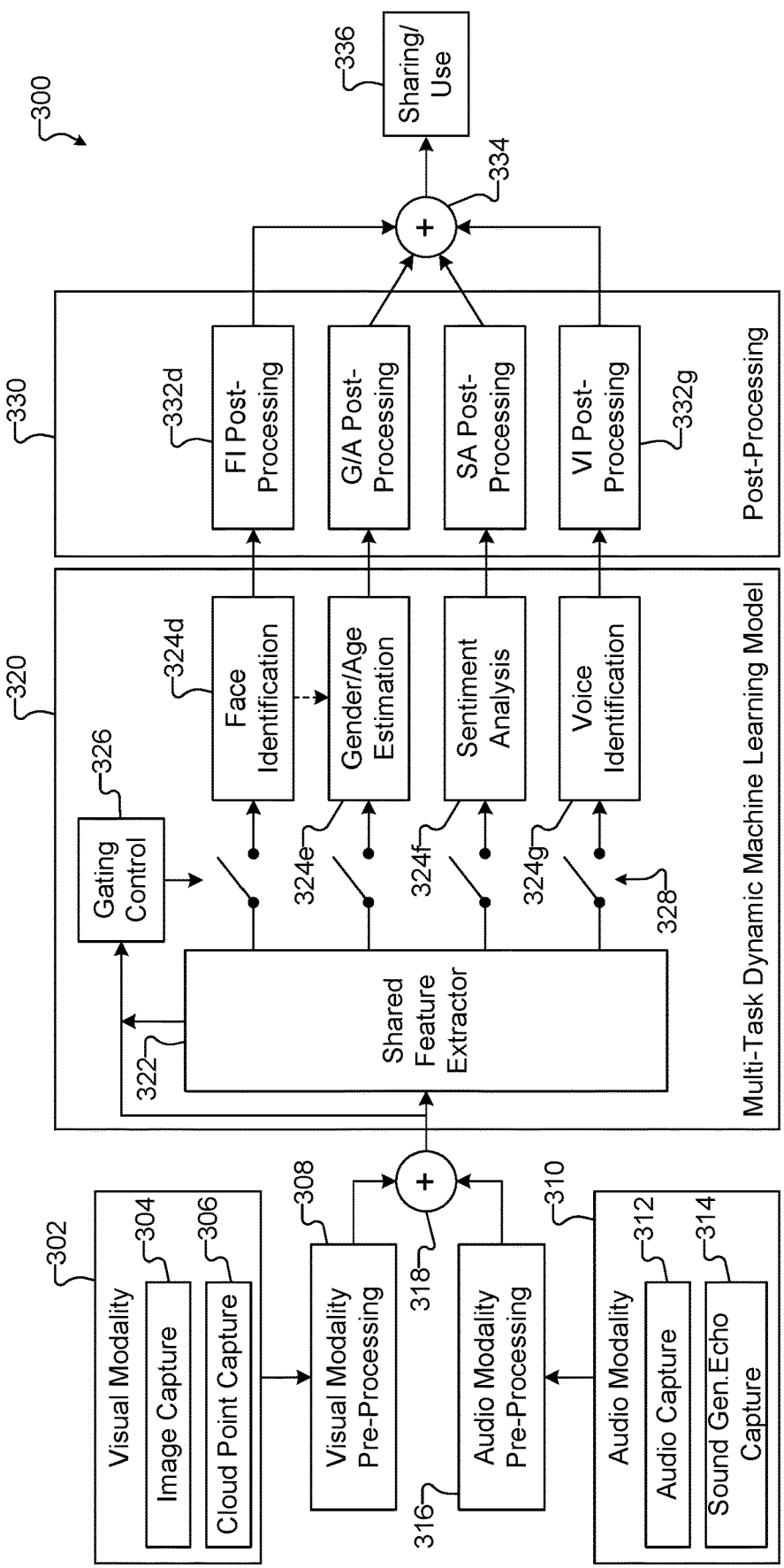

FIGS. 3 and 4 illustrate an example architecture 300 supporting smart home automation using multi-modal contextual information in accordance with this disclosure. For ease of explanation, the architecture 300 shown in FIGS. 3 and 4 is described as being implemented on or supported by the electronic device 101 in the network configuration 100 of FIG. 1, which may be configured to perform the process 200 shown in FIG. 2.

However, the architecture 300 shown in FIGS. 3 and 4 could be used as part of any other suitable process implemented on or supported by any other suitable device(s) and in any other suitable system(s).

As shown in FIG. 3, the architecture 300 generally operates to receive and process multi-modal inputs. In this example, the multi-modal inputs may include a visual modality 302, which can include inputs generated during one or more image capture operations 304 and one or more cloud point capture operations 306. Each image capture operation 304 can involve capturing or otherwise obtaining one or more images using at least one camera or other imaging sensor 180 of the electronic device 101, Each cloud point capture operation 306 can involve capturing or otherwise obtaining one or more three-dimensional (3D) cloud points identifying the 3D environment around the electronic device 101 using at least one 3D sensor or other sensor 180 of the electronic device 101. The inputs captured as part of the visual modality 302 may include any suitable visual-related data, such as RGB image frames, RGB-depth (RGB-D) image frames, or RGB-point cloud image frames. The visual data captured as part of the visual modality 302 can be provided to a visual modality pre-processing operation 308, which may normalize, resize, or otherwise pre-process the visual data for further processing by a machine learning model. In some cases, for instance, the visual data can be resized and normalized according to the machine learning model's input shape requirements.

The multi-modal inputs may also include an audio modality 310, which can include inputs generated during one or more audio capture operations 312 and one or more sound generation and echo capture operations 314. Each audio capture operation 312 can involve capturing or otherwise obtaining audio data using at least one microphone or other audio sensor 180 of the electronic device 101, Each sound generation and echo capture operation 314 can involve the generation of audio signals (such as ultrasonic or other audio signals) using at least one speaker of the electronic device 101 and the capturing of echoes produced by the audio signals using at least one microphone or other audio sensor 180 of the electronic device 101. As a particular example, a narrow-band "room impulse response" can be generated by emitting an ultrasonic chirp (such as a chirp in the range of about 17 kHz to about 22 kHz) from at least one speaker of the electronic device 101, The echoes of the ultrasonic chirp can be captured using at least one microphone or other audio sensor 180 of the electronic device 101. The inputs captured as part of the audio modality 310 may include any suitable audio-related data. The audio data captured as part of the audio modality 310 can be provided to an audio modality pre-processing operation 316, which may prepare the audio data for further processing by a machine learning model. In some cases, for instance, the echoes captured as part of the audio modality 310 may be pre-processed to produce a narrow-band room impulse response RGB spectrogram and audible range spectrograms can be generated for other audio inputs, both of which can be normalized, resealed, or otherwise pre-processed.

Note that, at any given time, one or both of the visual and audio modalities 302 and 310 (or possibly one or more other modalities) may be available for use in generating contextual information. When at least one of the modalities is available, the pre-processed input data is provided via a combiner 318 to a multi-task dynamic machine learning model 320. For example, the combiner 318 may package the pre-processed input data into input tensors matching the input shape of the multi-task dynamic machine learning model 320. The multi-task dynamic machine learning model 320 here includes a shared feature extractor 322, which generally operates to extract features of the input data. For instance, the shared feature extractor 322 may be trained to determine features of input data that are relevant to the specific tasks for which the multi-task dynamic machine learning model 320 has been trained, and the shared feature extractor 322 can extract these features from specific input data being processed. The shared feature extractor 322 includes any suitable machine learning-based structure or other logic used to extract features from input data, such as one or more convolutional neural network (CNN) layers. As a particular example, the shared feature extractor 322 may be implemented using an EfficientNet feature encoder.

As shown in FIGS. 3 and 4, the multi-task dynamic machine learning model 320 also includes multiple sub-models 324a-324g, each of which represents a portion of the multi-task dynamic machine learning model 320 that has been trained to perform at least one specific machine learning function. Each of the sub-models 324a-324g may itself represent a machine learning model that has been trained to perform the specific machine learning function(s). The structure of each sub-model 324a-324g and the training of each sub-model 324a-324g can vary depending on (among other things) the specific machine learning function(s) performed using that sub-model 324a-324g.

In this example, the sub-model 324a may be trained to perform room type classification, which can involve identifying the specific type of room or other location in which the electronic device 101 is positioned. In some cases, the sub-model 324a can generate probabilities that the electronic device 101 is positioned in different locations, such as a living room, bedroom, kitchen, dining room, family room, bathroom, game room, home office, garage, or patio. Note, however, that any other or additional locations may be supported by the sub-model 324a. In some embodiments, the sub-model 324a can be implemented using a dense classification layer using the top layer output of the shared feature extractor 322.

The sub-model 324b may be trained to perform pose estimation, which can involve identifying positions of at least one user's body or portions of that user's body. For example, the sub-model 324b may be trained to identify key-points of each user's body, such as specific points related to the user's face, head, torso, arms, and legs. In some cases, the identified key-points may be used as part of the contextual information being generated for the electronic device 101. In other cases, the identified key-points may be provided (such as via an API) to one or more other sub-models that can process or rely on the identified user poses. In still other cases, a combination of these approaches may be used.

The sub-model 324c may be trained to perform activity recognition, which can involve identifying the specific type (s) of human activity or activities that are occurring in the environment around the electronic device 101. In some cases, the sub-model 324c can generate probabilities that human activities around the electronic device 101 include activities in different classifications, such as classifications related to art (like dancing, sculpting, painting, music, theatre, or crafts), fitness (like cardio, training, yoga, or Pilates), leisure (like reading, writing, talking on the phone, watching TV, shopping, or playing games), food (like cooking, eating, or drinking), household chores (like cleaning or gardening), children (like eating, laughing, playing, sleeping, waking up, crying, crawling, or carrying a baby), or others. Note, however, that any other or additional classifications of activities may be supported by the sub-model 324c. In some embodiments, the sub-model 324c can consume key-point predictions from the sub-model 324b and can be implemented using encoder and classification layers. Other embodiments of the sub-model 324c can exploit the temporal nature of the inputs and make use of attention or transformer techniques.

The sub-model 324d may be trained to perform facial identification, which can involve identifying specific users of the electronic device 101 based on images or other visual information. In some cases, the sub-model 324d can generate probabilities that specific users have been identified in the environment around the electronic device 101. As a particular example, the sub-model 324d could generate or otherwise obtain a feature vector associated with each user's image and compare that feature vector to known users (such as feature vectors obtained during a previous onboarding of users) as a way to identify known users. Depending on the implementation, the sub-model 324d may be trained to operate independently or trained to rely on key-point predictions from the sub-model 324b. Using the key-point predictions from the sub-model 324b may be useful when performing multi-person identification, since much of the processing load may involve identifying bounding boxes and head poses of users prior to user identification. In some cases, the sub-models 324b and 324d can be trained by optimizing joint loss functions so that the pose estimation functionality can be extended to produce facial identifications.

The sub-model 324e may be trained to perform gender estimation, age estimation, or both, which can involve estimating the gender, age, or both for each specific user of the electronic device 101. In some cases, the sub-model 324e can generate probabilities that each specific user has specific genders and/or probabilities that each specific user has an age within specified age ranges. Depending on the implementation, the sub-model 324e may be trained to operate independently or trained to rely on the facial identifications performed by the sub-model 324d. Using the facial identifications from the sub-model 324d may be useful when gender/age estimation is performed for multiple users, since much of the processing load may involve identifying bounding boxes and faces of users prior to gender/age estimation. In some embodiments, the sub-model 324e can be implemented using one or more convolutional layers and two or more fully-connected layers to implement gender and/or age classification.

The sub-model 324f may be trained to perform sentiment analysis, which can involve using audio inputs (such as from people and music captured by one or more microphones) to identify micro-tags of sentiment. In some cases, the sub-model 324f can generate probabilities that the audio inputs are positive, negative, or neutral. In some embodiments, the sub-model 324f may rely on a different type of pre-processing for the audio modality 310 than other sub-models described above. For instance, instead of generating a spectrogram of a narrow-band room impulse response, the sub-model 324f can process features extracted from audible range spectrograms of the audio inputs.

The sub-model 324g may be trained to perform voice identification, which can involve identifying specific users of the electronic device 101 based on audio information. In some cases, the sub-model 324g can generate probabilities that specific users have been identified in the environment around the electronic device 101. As a particular example, the sub-model 324g could generate or otherwise obtain a feature vector associated with each user's voice and compare that feature vector to known users (such as feature vectors obtained during a previous onboarding of users) as a way to identify known users. In some embodiments, the sub-model 324g may again use a different type of pre-processing for the audio modality 310 than other sub-models described above. For instance, instead of generating a spectrogram of a narrow-band room impulse response, the sub-model 324g can process features extracted from audible range spectrograms of the audio inputs.

Note that while various sub-models 324a-324g are shown here along with possible interactions among certain ones of the sub-models 324a-324g, these sub-models 324a-324g and interactions among sub-models are for illustration only. Each specific implementation of the architecture 300 may include any combination of sub-models 324a-324g or other/additional sub-models. Also, any suitable connections or interactions may be used between any of the sub-models in the architecture 300.

As noted above, the specific sub-models 324a-324g that are used to process input data at any given time can vary based on various factors, such as the type(s) of input data available and the type(s) of output results to be generated and used. In some cases, for instance, a user may enable or disable one or more of the sub-models 324a-324g, such as based on privacy settings selected by the user. As a result, the multi-task dynamic machine learning model 320 may be described as a "dynamic graph" multi-task machine learning model since the model 320 can change its internal structure dynamically at inference time by assessing the input/output data and applying the user's preferences. In this example, the selective use of the sub-models 324a-324g is achieved using a gating control function 326, which can be used to control logical switches 328. Note that the logical switches 328 here are merely meant to illustrate the ability of the multi-task dynamic machine learning model 320 to selectively apply features from the shared feature extractor 322 to the sub-models 324a-324g.

The gating control function 326 can use any suitable technique to determine which sub-models 324a-324g are used to process the features from the shared feature extractor 322. For example, the gating control function 326 can receive the input tensors provided to the shared feature extractor 322 or the generated features from the shared feature extractor 322 and use the input tensors/features to identify the modality or modalities of available input data. Using this information, the gating control function 326 can determine which machine learning tasks can be performed for the given input data. However, these determinations could be overruled by the user's preferences, such as when the user's preferences enable or disable certain machine learning tasks or set a time limit for loading models or performing inferencing. In some cases, the gating control function 326 can generate a control vector with entries indicating which sub-models 324a-324g should and should not be used during inferencing. In some embodiments, the gating control function 326 may be implemented using encoders with a softmax function or using classification layers that process features from the shared feature extractor 322. These approaches may be useful when working with multiple modalities and the input data is incomplete, such as when one or more modalities are missing and there is a low cross-modality correlation.

As described above, one possible limitation on running the multi-task dynamic machine learning model 320 in an embedded device is the memory and computational requirements of the model 320. This limitation can be at least partially overcome by implementing conditional computations, which can be achieved by activating or using only some of the sub-models 324a-324g at any given time. Here, the selection of which sub-models 324a-324g are used can be input-dependent. In some cases, an activation policy can be used to define how the gating control function 326 enables or disables various ones of the sub-models 324a-324g.

The multi-task dynamic machine learning model 320 may be implemented overall in any suitable manner. For example, in some embodiments, the architecture of the multi-task dynamic machine learning model 320 may be obtained using a neural architecture search (NAS), which is an "AutoML" technique for automating the design of artificial neuronal networks (ANNs), in combination with dynamic neural network techniques. This results in a compilation of machine learning models that can perform various machine learning tasks. In some cases, the architectures in the set of models can have shared architecture patterns. For example, the models may represent one or more single-shot architectures that use EfficientNet or other feature extractor for each machine learning task. In addition, the models can have other commonalities, such as the use of attention or transformers or the manner in which they consume features for multi-resolution inference. Once the set of model candidates is selected, the common elements can be separated (such as features extraction), and each candidate model can be wrapped as a sub-model that can consume the features from the shared feature extractor 322.

The outputs generated by the selected sub-models 324a-324g are provided to a post-processing block 330, which includes a number of post-processing functions 332a-332g. Each post-processing function 332a-332g can take its associated sub-model's outputs and resolve the outputs into the domain associated with that sub-model. For example, the post-processing function 332a may receive probabilities that the electronic device 101 is located in different types of locations, and the post-processing function 332a can make a final selection of the likely type of location in which the electronic device 101 is positioned. Similarly, the post-processing function 332b can make a final determination of user poses, the post-processing function 332c can make a final determination of one or more user activities, and the post-processing function 332d can make a final image-based determination of one or more user identities. In addition, the post-processing function 332e can make a final determination of each user's gender/age, the post-processing function 332f can make a final determination of at least one user's sentiment, and the post-processing function 332g can make a final voice-based determination of one or more user identities. The final determinations from the post-processing functions 332a-332g can be combined via a combiner 334 to produce a set of contextual information. A sharing/use function 336 can share the set of contextual information with one or more other electronic devices (such as one or more subscribers) via an API or other suitable interface. The sharing/use function 336 can also use the set of contextual information (possibly along with contextual information received from one or more other electronic devices) to perform one or more home automation functions.

It should be noted that the functions shown in or described with respect to FIGS. 3 AND 4 can be implemented in an electronic device 101, server 106, or other device(s) in any suitable manner. For example, in some embodiments, at least some of the functions shown in or described with respect to FIGS. 3 AND 4 can be implemented or supported using one or more software applications or other software instructions that are executed by the processor 120 of the electronic device 101, server 106, or other device(s). In other embodiments, at least some of the functions shown in or described with respect to FIGS. 3 AND 4 can be implemented or supported using dedicated hardware components. In general, the functions shown in or described with respect to FIGS. 3 AND 4 can be performed using any suitable hardware or any suitable combination of hardware and software/firmware instructions.

Although FIGS. 3 and 4 illustrate one example of an architecture 300 supporting smart home automation using multi-modal contextual information, various changes may be made to FIGS. 3 and 4. For example, various components and operations in FIGS. 3 and 4 may be combined, further subdivided, replicated, rearranged, or omitted according to particular needs. Also, one or more additional components and operations may be included if needed or desired. In addition, while FIGS. 3 and 4 illustrate specific examples of input modalities and machine learning sub-models that may be used, the architecture 300 may support any suitable combination of input modalities and any suitable combination of machine learning sub-models.

Figure 5:
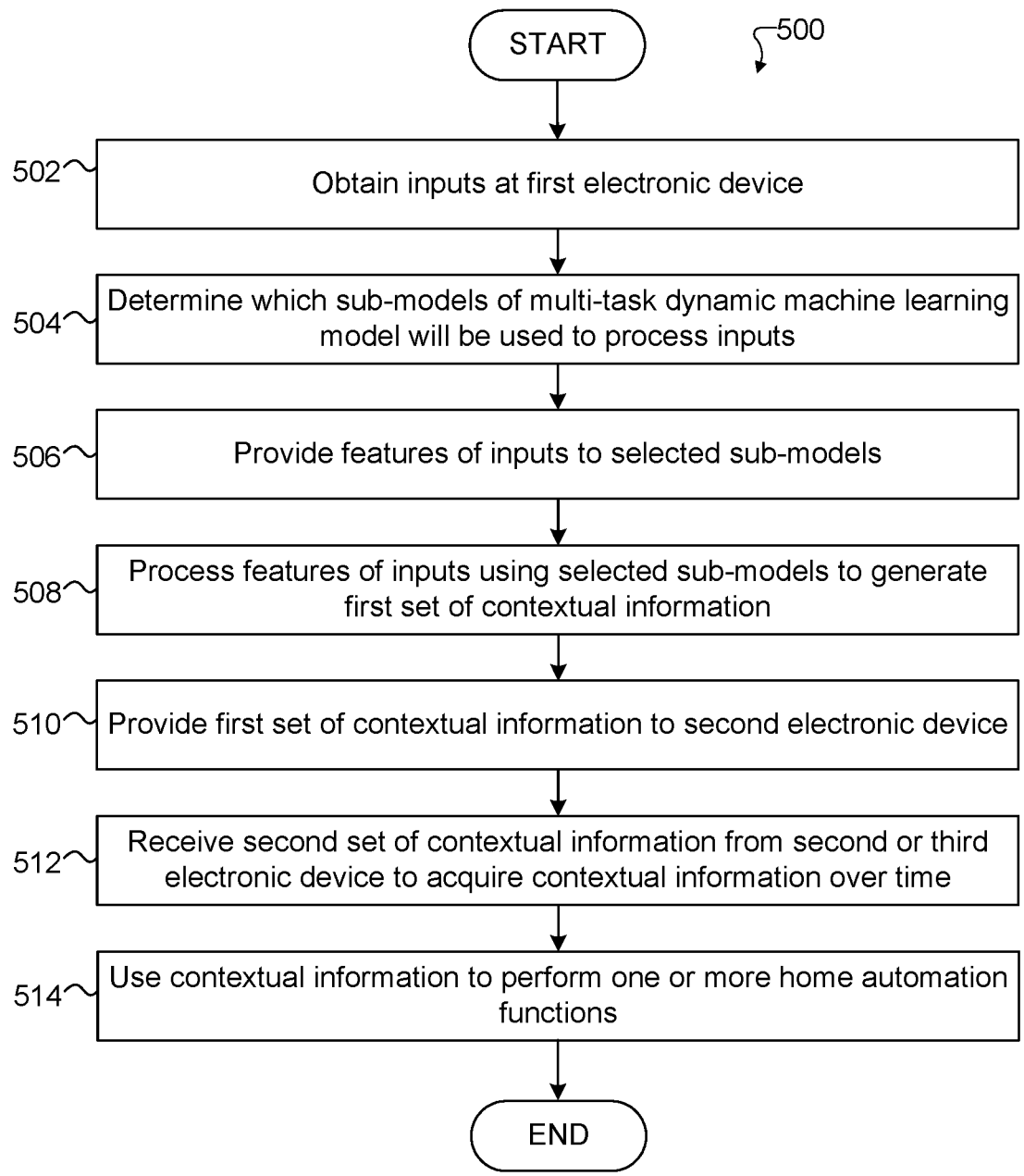
FIG. 5 illustrates an example method for smart home automation using multi-modal contextual information in accordance with this disclosure.

FIG. 5 illustrates an example method 500 for smart home automation using multi-modal contextual information in accordance with this disclosure. For ease of explanation, the method 500 shown in FIG. 5 is described as being performed using the electronic device 101 in the network configuration 100 of FIG. 1, which may be configured to perform the process 200 shown in FIG. 2 and support the architecture 300 shown in FIGS. 3 and 4. However, the method 500 shown in FIG. 5 could be performed as part of any other suitable process or architecture implemented on or supported by any other suitable device(s) and in any other suitable system(s), such as when the method 500 is also or alternatively performed using the electronic device 102, electronic device 104, or server 106.

As shown in FIG. 5, one or more inputs are obtained at a first electronic device at step 502. This may include, for example, the processor 120 of the electronic device 101 obtaining multi-modal or other inputs, such as visual inputs, audio inputs, or both. This may also include the processor 120 of the electronic device 101 pre-processing the one or more inputs. A determination is made which sub-models of a multi-task dynamic machine learning model will be used to process the one or more inputs at step 504. This may include, for example, the processor 120 of the electronic device 101 determining which sub-models 324a-324g will be used to process the input data based on (i) the type(s) of input data available and/or (ii) the type(s) of outputs to be generated. This may also include the processor 120 of the electronic device 101 taking into account one or more user preferences.

Features of the one or more inputs are provided to the selected sub-models of the multi-task dynamic machine learning model at step 506. This may include, for example, the processor 120 of the electronic device 101 providing the pre-processed input data to the shared feature extractor 322 for use in generating features of the input data. This may also include the processor 120 of the electronic device 101 providing the generated features to the selected sub-models 324a-324g. The features of the inputs are processed using the selected sub-models to produce a first set of contextual information at step 508. This may include, for example, the processor 120 of the electronic device 101 processing the features of the input data to perform one or more of room type classification, pose estimation, activity recognition, facial identification, voice identification, gender estimation, age estimation, and sentiment analysis. This may also include the processor 120 of the electronic device 101 post-processing the results produced by the selected sub-models 324a-324g.

The first set of contextual information is provided to a second electronic device at step 510. This may include, for example, the processor 120 of the electronic device 101 transmitting the first set of contextual information via an API or other interface to at least one other smart device, such as the electronic device 102 or 104. A second set of contextual information is received from the second electronic device or a third electronic device at step 512. This may include, for example, the processor 120 of the electronic device 101 receiving the second set of contextual information via an API or other interface from at least one other smart device, such as the electronic device 102 or 104. Among other things, this may allow the electronic device 101 to acquire contextual information over time as at least one user moves within a specified environment, such as a household. The contextual information can be used to perform one or more home automation functions at step 514. This may include, for example, the processor 120 of the electronic device 101 estimating a user's intent during a task invocation based on the available contextual information.

Although FIG. 5 illustrates one example of a method 500 for smart home automation using multi-modal contextual information, various changes may be made to FIG. 5. For example, while shown as a series of steps, various steps in FIG. 5 may overlap, occur in parallel, occur in a different order, or occur any number of times. Also, one or more steps may be omitted from FIG. 5 if needed or desired.

Figure 6:
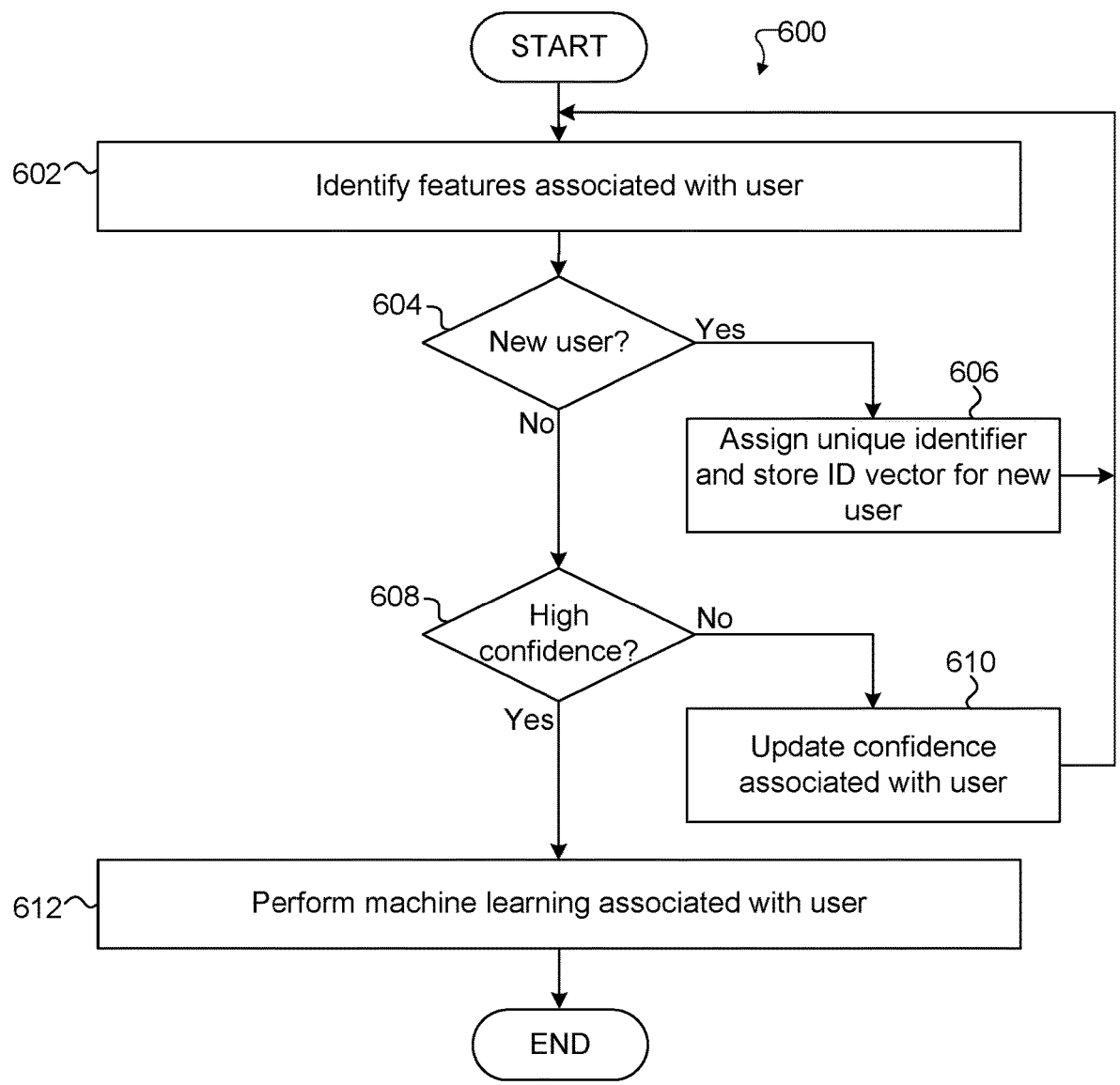
FIG. 6 illustrates an example method for user identification to support smart home automation using multi-modal contextual information in accordance with this disclosure.

FIG. 6 illustrates an example method 600 for user identification to support smart home automation using multi-modal contextual information in accordance with this disclosure. For ease of explanation, the method 600 shown in FIG. 6 is described as being performed using the electronic device 101 in the network configuration 100 of FIG. 1, which may be configured to perform the process 200 shown in FIG. 2 and support the architecture 300 shown in FIGS. 3 and 4. However, the method 600 shown in FIG. 6 could be performed as part of any other suitable process or architecture implemented on or supported by any other suitable device(s) and in any other suitable system(s), such as when the method 600 is also or alternatively performed using the electronic device 102, electronic device 104, or server 106.

In some cases, the method 600 may be used to support facial identification, voice identification, or both within the architecture 300. One common problem when working with biometric information involves a lack of participation in onboarding, which generally refers to pre-registration steps that are often needed per person of the household. The method 600 here can help to reduce or avoid these types of issues by anonymously making estimations of people's identifications. As shown in FIG. 6, features associated with a user are identified at step 602. This may include, for example, the processor 120 of the electronic device 101 generating or otherwise obtaining a feature vector associated with a current user's image or voice. A determination is made whether the user appears to be a new (unknown) user at step 604. This may include, for example, the processor 120 of the electronic device 101 comparing the feature vector of the current user with feature vectors associated with known prior users. If the feature vector of the current user is within some threshold amount of similarity (such as when a cosine similarity value is above a threshold value), the current user may be perceived as being a known user.

If the current user is determined to be a new user at step 604, a unique identifier is assigned to the current user, and an identification (ID) vector for the current user is stored at step 606. This may include, for example, the processor 120 of the electronic device 101 assigning a unique numeric or alphanumeric identifier to the new user and storing the feature vector of the new user in association with the identifier. The process can return to step 602 and await additional information associated with the same user or a different user.

If the current user is not a new user at step 604, a determination is made whether the new user's identification has a high confidence level at step 608. This may include, for example, the processor 120 of the electronic device 101 determining whether the feature vector of the current user is associated with a single stored feature vector of a prior user or multiple stored feature vectors of a prior user. Similarity with a single stored feature vector may have a relatively low confidence, while similarity with multiple stored feature vectors may have a relatively high confidence. Ideally, over time, the estimation confidence improves as more and more feature vectors are associated with a common user. Here, if the confidence level is low (such as below a threshold value) at step 608, the confidence associated with the user can be updated at step 610. This may include, for example, the processor 120 of the electronic device 101 storing the feature vector for the current user in association with one or more feature vectors for the existing user and incrementing or otherwise increasing the confidence level for that user. If the confidence level is adequately high (such as above the threshold value) at step 608, machine learning associated with the user can be performed at step 610. This may include, for example, the processor 120 of the electronic device 101 generating an identification of the user (such as when performing facial or voice recognition using the sub-model 324d or 324g) and using the user's identification in some manner.

Although FIG. 6 illustrates one example of a method 600 for user identification to support smart home automation using multi-modal contextual information, various changes may be made to FIG. 6. For example, while shown as a series of steps, various steps in FIG. 6 may overlap, occur in parallel, occur in a different order, or occur any number of times. Also, one or more steps may be omitted from FIG. 6 if needed or desired.

The techniques for smart home automation using multi-modal contextual information described above can be used to support any number of possible applications. The following represent example use cases where smart home automation using multi-modal contextual information can be used, Note, however, that these use cases are examples only and that smart home automation using multi-modal contextual information may be used in any other suitable manner for any other suitable purpose.

One set of use cases can involve functions performed using a single smart home automation device, such as a single smart television. Examples of these use cases can include performing soft user identification, providing a single sign-on, providing a gesture-based control interface, allowing for parametric and generative art content generation, and providing immersive and hands-free augmented reality experiences. Performing soft user identification may involve processing inputs in order to passively identify a potential user of a smart home automation device in order to provide personalized dashboards, widgets, or other content on the smart home automation device. Providing a single sign-on may involve using facial and/or voice identification and contextual awareness in order to identify a user and log the user into one or multiple services available on a smart home automation device. Providing a gesture-based control interface may involve processing inputs to recognize user's gestures in order to support user control of third-party applications, games, and TV viewing on a smart home automation device. Allowing for parametric and generative art content generation may involve processing inputs to recognize user's gestures or other characteristics in order to support generation of paintings or other digital art. Providing immersive and hands-free augmented reality experiences may involve processing inputs to recognize user's gestures or other characteristics in order to support the generation of augmented reality content on a smart home automation device.

Another set of use cases can involve functions performed using multiple smart home automation devices, such as two or more smart televisions. Examples of these use cases can include smart intercom video-calling and information hand-off. Smart intercom video-calling can occur when devices intelligently allow users to communicate with other people in a household without knowing their exact locations. Information handoff can allow for seamless roaming media playback, meaning content is played or resumed on different devices as a user moves within his or her household. As a particular example of this, a user may look at a recipe on one device and resume looking at the same spot of the recipe on another device.

Yet another set of use cases can involve functions performed using a smart home ecosystem, such as an ecosystem that includes multiple smart devices that can interact with or be controlled by a smart home virtual assistant. Examples of these use cases can include sharing context information with a smart home virtual assistant to complement other sensors and enable high-level interactions and inquiries. As a particular example, a user may say "clean up this mess." Visual input can be used to identify a "mess" or dirty area within a given room, and a smart home virtual assistant can automatically trigger a robotic vacuum to move to and clean up that area. Other examples of these use cases can include making proactive notifications or suggestions, such as by triggering a notification of "you usually eat at this hour, would you like to order food or show quick recipes?" or "you looked stressed, would you like some calming music?" Still other examples of these use cases can include triggering various smart home automation functions automatically without user intervention.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining one or more inputs at a first electronic device, the first electronic device comprising a multi-task dynamic machine learning model that includes multiple sub-models configured to perform different machine learning functions;
generating features of the one or more inputs using a shared feature extractor trained to extract features of input data that are relevant to performing the different machine learning functions of the multiple sub-models;
dynamically selecting, using a gating control function that receives the extracted features from the shared feature extractor or the one or more inputs, the sub-models used to process the one or more inputs to dynamically change a structure of the multi-task dynamic machine learning model based on at least one of (i) the one or more inputs that are available for use or (ii) one or more outputs to be generated, and based on at least one predetermined setting enabling or disabling one or more of the sub-models;
performing post-processing on outputs from the selected sub-models using a plurality of post-processing operations each corresponding to one of the selected sub-models to resolve the outputs from the selected sub-models into domains associated with the sub-models, wherein each of the plurality of post-processing operations outputs a final determination corresponding to the domain for the respective sub-model; and
generating, based on a combination of the final determinations from the post-processing operations corresponding to the selected sub-models, a first set of contextual information associated with the first electronic device, at least a portion of the first set of contextual information associated with at least one user of the first electronic device.

2. The method of claim 1, further comprising:
sharing the first set of contextual information with at least a second electronic device in a specified environment.

3. The method of claim 2, further comprising:
receiving a second set of contextual information from the second electronic device or a third electronic device in the specified environment in order to acquire contextual information over time as the at least one user moves within the specified environment.

4. The method of claim 1, wherein the first set of contextual information comprises at least one of:
a household room type associated with a location of the first electronic device;
a human activity type associated with an activity by the at least one user; or
information about the at least one user.

5. The method of claim 4, wherein the human activity type is based on an intermediate representation including a pose estimation of the at least one user.

6. The method of claim 4, wherein the information about the at least one user comprises at least one of:
at least one identity of the at least one user;
a quantity of users;
at least one gender of the at least one user; or
at least one age of the at least one user.

7. The method of claim 1, wherein:
the one or more inputs comprise multi-modal inputs, the multi-modal inputs comprising visual inputs and audio inputs;
the method further comprises generating the features based on the multi-modal inputs; and
dynamically selecting the sub-models comprises selecting a subset of the sub-models to receive the features based on the first set of contextual information to be generated.

8. The method of claim 1, wherein the first electronic device comprises a television.

9. An electronic device comprising:
at least one memory configured to store a multi-task dynamic machine learning model that includes multiple sub-models configured to perform different machine learning functions; and at least one processing device configured to:
  obtain one or more inputs;
  generate features of the one or more inputs by use of a shared feature extractor trained to extract features of input data that are relevant to performing the different machine learning functions of the multiple sub-models;
  dynamically select, using a gating control function that receives the extracted features from the shared feature extractor or the one or more inputs, the sub-models used to process the one or more inputs to dynamically change a structure of the multi-task dynamic machine learning model based on at least one of (i) the one or more inputs that are available for use or (ii) one or more outputs to be generated, and based on at least one predetermined setting enabling or disabling one or more of the sub-models;
  perform post-processing on outputs from the selected sub-models using a plurality of post-processing operations each corresponding to one of the selected sub-models to resolve the outputs from the selected sub-models into domains associated with the sub-models, wherein each of the plurality of post-processing operations outputs a final determination corresponding to the domain for the respective sub-model; and
  generate, based on a combination of the final determinations from the post-processing operations corresponding to the selected sub-models, a first set of contextual information associated with the electronic device, at least a portion of the first set of contextual information associated with at least one user of the electronic device.

10. The electronic device of claim 9, wherein the at least one processing device is further configured to share the first set of contextual information with at least a second electronic device in a specified environment.

11. The electronic device of claim 10, wherein the at least one processing device is further configured to receive a second set of contextual information from the second electronic device or a third electronic device in the specified environment in order to acquire contextual information over time as the at least one user moves within the specified environment.

12. The electronic device of claim 9, wherein the first set of contextual information comprises at least one of:
  a household room type associated with a location of the electronic device;
  a human activity type associated with an activity by the at least one user; or
  information about the at least one user.

13. The electronic device of claim 12, wherein the human activity type is based on an intermediate representation including a pose estimation of the at least one user.

14. The electronic device of claim 12, wherein the information about the at least one user comprises at least one of:
  at least one identity of the at least one user;
  a quantity of users;
  at least one gender of the at least one user; or
  at least one age of the at least one user.

15. The electronic device of claim 9, wherein:
  the one or more inputs comprise multi-modal inputs, the multi-modal inputs comprising visual inputs and audio inputs;
  the at least one processing device is further configured to generate the features based on the multi-modal inputs; and to dynamically select the sub-models, the at least one processing device is configured to select a subset of the sub-models to receive the features based on the first set of contextual information to be generated.

16. The electronic device of claim 9, wherein the electronic device comprises a television.

17. A non-transitory computer readable medium containing instructions that when executed cause at least one processor of an electronic device to:
  obtain one or more inputs;
  provide the one or more inputs to a multi-task dynamic machine learning model that includes multiple sub-models configured to perform different machine learning functions;
  generate features of the one or more inputs by use of a shared feature extractor trained to extract features of input data that are relevant to performing the different machine learning functions of the multiple sub-models;
  dynamically select, using a gating control function that receives the extracted features from the shared feature extractor or the one or more inputs, the sub-models used to process the one or more inputs to dynamically change a structure of the multi-task dynamic machine learning model based on at least one of (i) the one or more inputs that are available for use or (ii) one or more outputs to be generated, and based on at least one predetermined setting enabling or disabling one or more of the sub-models;
  perform post-processing on outputs from the selected sub-models using a plurality of post-processing operations each corresponding to one of the selected sub-models to resolve the outputs from the selected sub-models into domains associated with the sub-models, wherein each of the plurality of post-processing operations outputs a final determination corresponding to the domain for the respective sub-model; and
  generate, based on a combination of the final determinations from the post-processing operations corresponding to the selected sub-models, a first set of contextual information associated with the electronic device, at least a portion of the first set of contextual information associated with at least one user of the electronic device.

18. The non-transitory computer readable medium of claim 17, further containing instructions that when executed cause the at least one processor to at least one of:
  share the first set of contextual information with at least a second electronic device in a specified environment; and
  receive a second set of contextual information from the second electronic device or a third electronic device in the specified environment in order to acquire contextual information over time as the at least one user moves within the specified environment.

19. The non-transitory computer readable medium of claim 17, wherein the first set of contextual information comprises at least one of:
  a household room type associated with a location of the electronic device;
  a human activity type associated with an activity by the at least one user, the human activity type based on an intermediate representation including a pose estimation of the at least one user; or
  information about the at least one user, the information about the at least one user comprising at least one of:
    at least one identity of the at least one user;
    a quantity of users;

at least one gender of the at least one user; or at least one age of the at least one user.

20. The non-transitory computer readable medium of claim 17, wherein:

the one or more inputs comprise multi-modal inputs, the multi-modal inputs comprising visual inputs and audio inputs;

the non-transitory computer readable medium further contains instructions that when executed cause the at least one processor to generate the features based on the multi-modal inputs; and the instructions that when executed cause the at least one processor to dynamically select the sub-models comprise:

instructions that when executed cause the at least one processor to select a subset of the sub-models to receive the features based on the first set of contextual information to be generated.

\* \* \* \* \*